(12) United States Patent
Higgins et al.

(10) Patent No.: US 6,370,146 B1
(45) Date of Patent: Apr. 9, 2002

(54) METHOD AND APPARATUS FOR NON-DISRUPTIVE ADDITION OF A NEW NODE TO AN INTER-NODAL NETWORK

(75) Inventors: Peter Higgins, Sandwich; Rafal J. Jazwierski, West Yarmouth, both of MA (US)

(73) Assignee: Lucent Technologies Inc., Holmdel, NJ (US)

(*) Notice: Subject to any disclaimer, the term of this patent is extended or adjusted under 35 U.S.C. 154(b) by 0 days.

(21) Appl. No.: 09/107,152

(22) Filed: Jun. 29, 1998

(51) Int. Cl.[7] .................................................. H04J 3/02
(52) U.S. Cl. ....................... 370/400; 370/221; 370/235; 370/254; 370/465
(58) Field of Search ................................ 370/218, 219, 370/220, 221, 222, 223, 224, 235, 254, 352, 375, 400, 401, 402, 403, 404, 449, 465; 340/825.2, 825.31

(56) References Cited

U.S. PATENT DOCUMENTS

| | | | | |
|---|---|---|---|---|
| 4,680,753 A | * | 7/1987 | Fulton et al. | 370/449 |
| 5,535,213 A | * | 7/1996 | Pan et al. | 370/403 |
| 5,544,163 A | | 8/1996 | Madonna | 370/60.1 |
| 5,923,643 A | * | 7/1999 | Higgins et al. | 370/404 |
| 6,047,331 A | * | 4/2000 | Medard et al. | 709/239 |

OTHER PUBLICATIONS

Yang, C.S. et al., "A Reconfigurable Modular Falut–Tolerant Binary Tree Architecture" Proceedings of the International Phoenix Conference on Computers and Communications, U.S. New York, IEEE, vol. Conf 12, p. 37–41 XP000370456, ISBN 0–7803–0922–7, (1993).

Noh T.H. et al, "Reconfiguration for Service and Self–Healing in ATM Networks Based on Virtual Paths" Computer Networks and ISDN Systems, 1997. NL, North Holland Publishing, Amsterdam, vol. 29, No. 16, p. 1857–1867, XP004107248, ISSN: 0169–7552 (1997).

* cited by examiner

*Primary Examiner*—Douglas Olms
*Assistant Examiner*—Shick Hom
(74) *Attorney, Agent, or Firm*—Cesari and McKenna, LLP

(57) ABSTRACT

A method and apparatus for the non-disruptive addition of one or more nodes to an active inter-nodal network is provided. A telecommunications switching system includes a plurality of nodes interconnected by an inter-nodal network which carries packetized information among the nodes. A host which issues various control instructions is connected to at least one node in the system. When one or more new nodes are to be added to the system, the two nodes adjacent to the location selected for the new node are instructed to begin a synchronized routine for simultaneously beginning to temporarily operate in a special loop back mode of operation which allows telecommunications traffic to continue to travel on the inter-nodal network while the new node or nodes are being physically connected into the system. Thereafter, a sequence of instructions provides for a synchronized routine for both neighbor nodes to return to open operating mode from loopback mode simultaneously. The instruction sequences are issued by a host and a master node of the system for implementing the non-disruptive addition of the new node or nodes to the system.

33 Claims, 10 Drawing Sheets

METHOD AND APPARATUS FOR NON-DISRUPTIVE ADDITION OF A NEW NODE TO AN INTER-NODAL NETWORK

FIELD OF THE INVENTION

The present invention relates generally to the field of telecommunications and, more specifically, to a system for expansion of a telecommunications network with minimal disruption of traffic service on the network.

BACKGROUND OF THE INVENTION

A fundamental consideration in any telecommunications system design is switching capacity. Switching capacity must be analyzed in terms of current demand and projected demand in order to find a solution that is cost effective for both present and future service. For example, assume that a developing country is in the process of building a basic telecommunications system and intends to provide service to most of its current population. Such a population is most likely geographically distributed among small areas of high density (cities) and larger areas of low density (suburban and rural). In addition, the population is probably growing, but at different rates in different areas. Thus, the challenge for a telecommunications system designer is to provide sufficient switching capacity to support satisfactory service to most or all of the population while also anticipating likely increases in future demand and providing for economical expansion.

A second fundamental consideration in telecommunications system design is providing for the addition of new features or services in the future. Telecommunications equipment and service continues to evolve rapidly, due in large part to the advent of digital technology. Even more dramatic advances are likely in the future, particularly as previously separate industries such as the Internet, cable television and local telephone operating companies integrate services. Again, the challenge is to create a system which economically serves a present need, while also providing flexible and inexpensive ways to integrate new features and services as they become available. Ideally, such new features and services can be added to an existing system without disruption of service, but this has not always been possible.

Several of these fundamental considerations are addressed in a system described in commonly-assigned U.S. Pat. No. 5,544,163, Aug. 6, 1996, entitled EXPANDABLE TELECOMMUNICATIONS SYSTEM, which is incorporated herein in its entirety. Briefly, the patent describes an open, high speed, high bandwidth digital communications network for connecting multiple programmable telecommunications switches to form a large capacity, non-blocking switching system. In a preferred embodiment described therein, the network is implemented using one or more inter-nodal networks which provide a medium for transferring information over the network, and a plurality of programmable switches, each of which appears as a node on the network and serves a group of ports. Additional switches (nodes) may be added to the network as desired to increase the system's switching capacity.

Each node includes circuitry for transmitting and receiving variable-length, packetized information over the network, thus enabling each node to receive information from or transmit information to all other nodes. The network may carry any type of information present in the system including voice, data, video, multimedia, control, configuration and maintenance, and the bandwidth of the network may be divided or shared across various information types.

In addition, devices or resources other than programmable switches may also act as nodes on the network, thereby gaining direct access to all information passing through the network. More specifically, voice processing resources such as voice mail/message systems or other enhanced service platforms may, by becoming nodes, gain direct access to all ports served by the system without the need for a large central switch. The system's ability to transfer information of any type, in a readily usable form, at high speed across the network enables any service, feature or voice processing resource which is available at a given node to be provided to any port of the same or any other node.

The programmable switching nodes and the other nodes on an expandable telecommunications system are connected by a physical medium. When it is desired to modify an active inter-nodal network in order to enhance the services or increase the capacity provided by the system, by the inclusion of one or more additional nodes, the physical medium must be modified to accommodate an additional node. More specifically, the physical connections between the nodes in the inter-nodal network adjacent to the area to be expanded must be temporarily physically disconnected in order to connect the new node or nodes into the network. When the physical medium is disconnected, that portion of the inter-nodal network cannot, of course, carry telecommunications traffic. Typically, in such a case, the system, in whole or in part, must be taken out of service, thus leading to possibly unacceptable levels of service interruption.

Also, a new node which is added to the system must be properly configured before beginning operation to avoid undesired interference with other nodes.

There remains a need, therefore, for a telecommunications system which can be expanded by the addition of one or more new nodes with minimal, if any, disruption of telecommunications service provided by the system.

There remains a further need for a method of adding a new node to an existing, active system with essentially no interruption of service in the system.

SUMMARY OF THE INVENTION

These and other needs are satisfied by the present invention which provides, in brief summary, a method and system for non-disruptive addition of one or more nodes to an active inter-nodal network in a telecommunications system. In a preferred embodiment the invention is implemented in a method and an associated system which includes a plurality of interconnected nodes, which may be nodes used for telecommunications switching, or other nodes used for voice processing resources such as voice mail/messaging and the like. The nodes are interconnected by an inter-nodal network which carries packetized information among all the nodes served by the inter-nodal network.

Each node has an open mode of operation and a special mode of operation referred to as loopback mode. More specifically, each node has an "A" I/O port, which has its own transmit and receive coupling, and a "B" I/O port, which has its own transmit and receive coupling. In the open mode of operation, packets traverse between the node and the inter-nodal network by coming into the node through the receive coupling of the "A" port and exiting the node by the transmit coupling of the "B" I/O port. In loopback mode, one of the I/O ports is effectively disconnected from the system while the other "loops back" and functions to both transmit and receive packets using its own transmit and receive coupling and an alternate communication path to continue to pass packets onto and receive packets from the inter-nodal network.

A host is connected in communicating relationship with at least one of the nodes in the system. The host controls certain aspects of the system's operations by sending messages addressed to all nodes or specific messages to individual nodes. The system is also configured so that one of the nodes is a master node. The master node is capable of sending control messages addressed to the other, non-master, nodes in the network. In accordance with the invention, the master does this messaging, in part, by using a unique inter-nodal network control word. The inter-nodal network control word is a set of bits contained within a frame which in turn contains one or more packets originating from a particular node. In accordance with this aspect of the invention, a unique messaging sequence involves an interplay between messages issued by the host, which may be controlled by a user, and messages issued in turn by the master node, using the inter-nodal network control word. The inter-nodal network control word allows nodes to receive and execute instructions in a synchronized manner while avoiding the necessity of forcing the host to attempt to simultaneously communicate with multiple nodes. In still other circumstances, a non-master node will be enabled to write into the inter-nodal network control word to communicate certain types of information to the master node. This is also a time-saving technique which can by utilized to avoid interruption of system operation.

In accordance with the invention, when it is desired to expand an existing, active inter-nodal network, a location is selected along the inter-nodal network to connect one or more new nodes. As used herein, the term "new node" shall include one or more new nodes which can be programmable switching nodes, voice processing resource nodes, or other nodes, or a combination thereof as desired in a particular application. The two nodes in the active system which are adjacent to the selected location are identified. The two nodes between which the new node is to be added shall be referred to herein as the "neighbor" nodes, as they will neighbor the new node when it is added to the system.

The new node is prepared by the host for addition to the network by being programmed with instructions about the installation procedure it needs to follow. The inter-nodal network is then checked to ascertain whether any existing nodes are coincidentally operating in loopback mode. If no existing nodes are operating in loopback mode, the expansion of the system by the addition of the new node may continue. If, on the other hand, there is a node operating in loopback mode, then the fault or other condition causing that node to operate in loopback mode will have to be resolved first. This is because performing the installation procedure while any node is concurrently operating in loopback mode could cause other nodes to become isolated, and thus, cause interruption of service.

Once it is determined that all existing nodes are operating in open mode, the host issues a message addressed to the master node, instructing it to notify the two neighbor nodes, using the inter-nodal network control word, to begin a first synchronized routine to change their respective I/O ports to operate in loopback mode after a predetermined time delay. After this predetermined time period elapses, both neighbor nodes change their respective ports to operate in loopback mode essentially simultaneously. Accordingly, packetized information traversing the inter-nodal network continues to travel through the network uninterrupted except for that portion of the inter-nodal network between the two neighbor nodes. That portion is now temporarily isolated and inactive. Thus, the physical disconnection of that portion of the inter-nodal network can now take place without interruption of the remainder of the network. Thereafter, the new node or nodes are physically connected into the network.

In accordance with another aspect of the invention, the new node follows a sequence of instructions, triggered by certain host-issued messages, which causes the node to wait while the inter-nodal network, which continues to carry normal traffic, is configured to include the new node. This sequence of instructions is a short cut around the normal sequence of messages which would be followed by a node when an inter-nodal network is being brought into service and initialized. In accordance with the present invention, the new node follows the short cut instructions so that it enters the network in a running state as if it had always been in the network. This avoids the new node following its pre-programmed instructions for network initialization.

After the new node is connected into the inter-nodal network and the configurations tasks are accomplished, the two neighbor nodes must return to the open mode of operation out of loopback mode. In a manner similar to the sequence followed to place the two neighbor nodes into loopback mode, both nodes must be brought out of loopback mode approximately simultaneously. Otherwise, if one node returns its respective port to normal mode first, this leaves only one node operating in loopback mode, and the network will not function properly.

In order to avoid this, in accordance with the invention, a message is issued by the host, addressed to the master node, instructing it to notify the two neighbor nodes to commence a second synchronized routine, this time to discontinue loopback mode and return to open mode after a predetermined time delay. The predetermined time delay allows both nodes to receive the instruction and begin the timing sequence prior to either one of them returning to the open mode of operation. In this way, both neighbor nodes, between which the new node is now inserted, return to open mode essentially simultaneously.

After the two neighbor nodes return to open mode, the host sends a message to the new node in response to which the new node attempts to verify that it is recognizable by the master node. The new node does this by sending a message to the master node, using the inter-nodal network control word. The new node waits for an acknowledgment from the master node. When the acknowledgment is received, then a final verification is performed to ascertain that the new node or nodes as well as the neighbor nodes have open ports. Thereafter, the new node can be configured to transmit and receive packets to and from the inter-nodal network, or to perform a redundancy function by being configured in a receive only mode, as desired in the application.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENTS

Figure 1A:
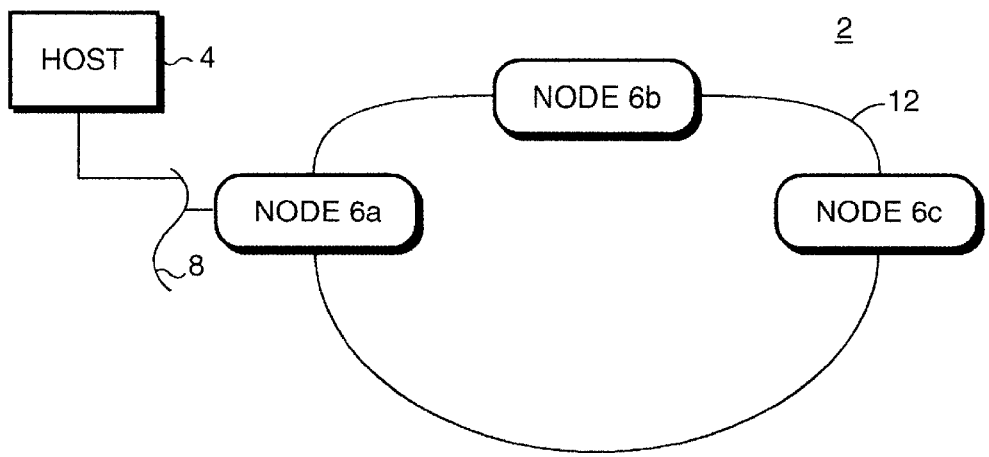
FIG. 1A is a schematic diagram of an expandable telecommunications system which employs a single inter-nodal network to transfer information among nodes.

FIG. 1A shows a large capacity, expandable, fully programmable telecommunications switching system 2. Details of the construction and operation of the system 2 may be found in the above-cited U.S. Pat. No. 5,544,163. To aid in understanding of the present invention, certain aspects of the system 2 are discussed here.

Figure 1B:
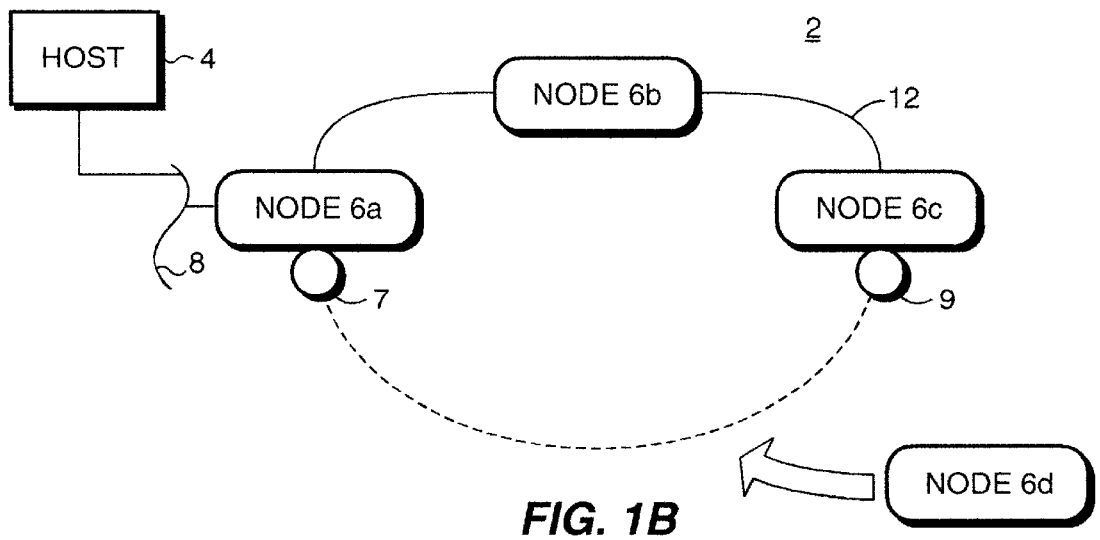
FIG. 1B is a schematic diagram of the system of FIG. 1A also depicting a new node to be added to the system and the two nodes adjacent to the new nodes operating in loopback mode in accordance with a preferred embodiment of the present invention.
Figure 1C:
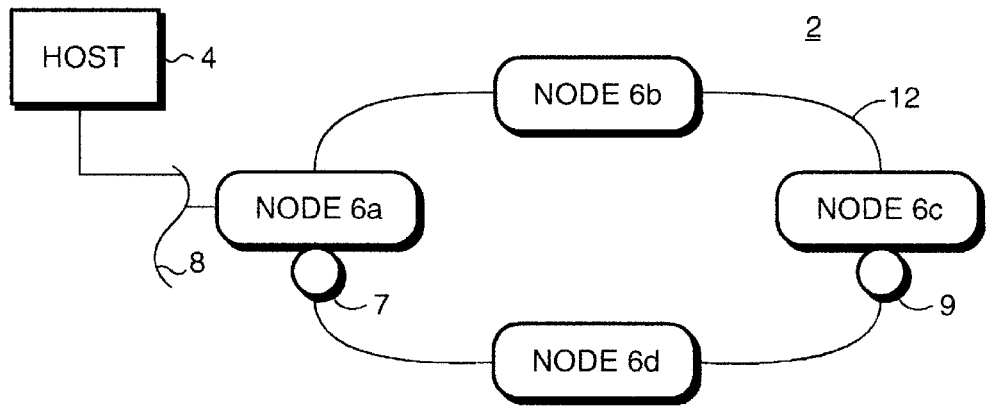
FIG. 1C is a schematic diagram of the system of FIG. 1A expanded in accordance with the present invention by the addition of a new node.

The telecommunications system 2 comprises a host 4, and three nodes, 6a through 6c, connected in communicating relationship by an inter-nodal network 12. It should be understood that a larger or small number of nodes being either programmable switching nodes or other types of non-switching (e.g., voice processing or communications services) nodes or bridge nodes may be used in essentially any combination in the system 2. It is desired to expand the telecommunications system 2 by the addition of another node, node 6d, as illustrated in FIG. 1B. The new node 6d may be of any type that is compatible with inter-nodal network 12. FIG. 1C illustrates new node 6d as it is incorporated into the system while the nodes proximate to it, node 6a and node 6c are in loopback mode as schematically illustrated in FIG. 1C by looped back port 7 on node 6a and looped back port 9 on node 6c.

Figure 2:
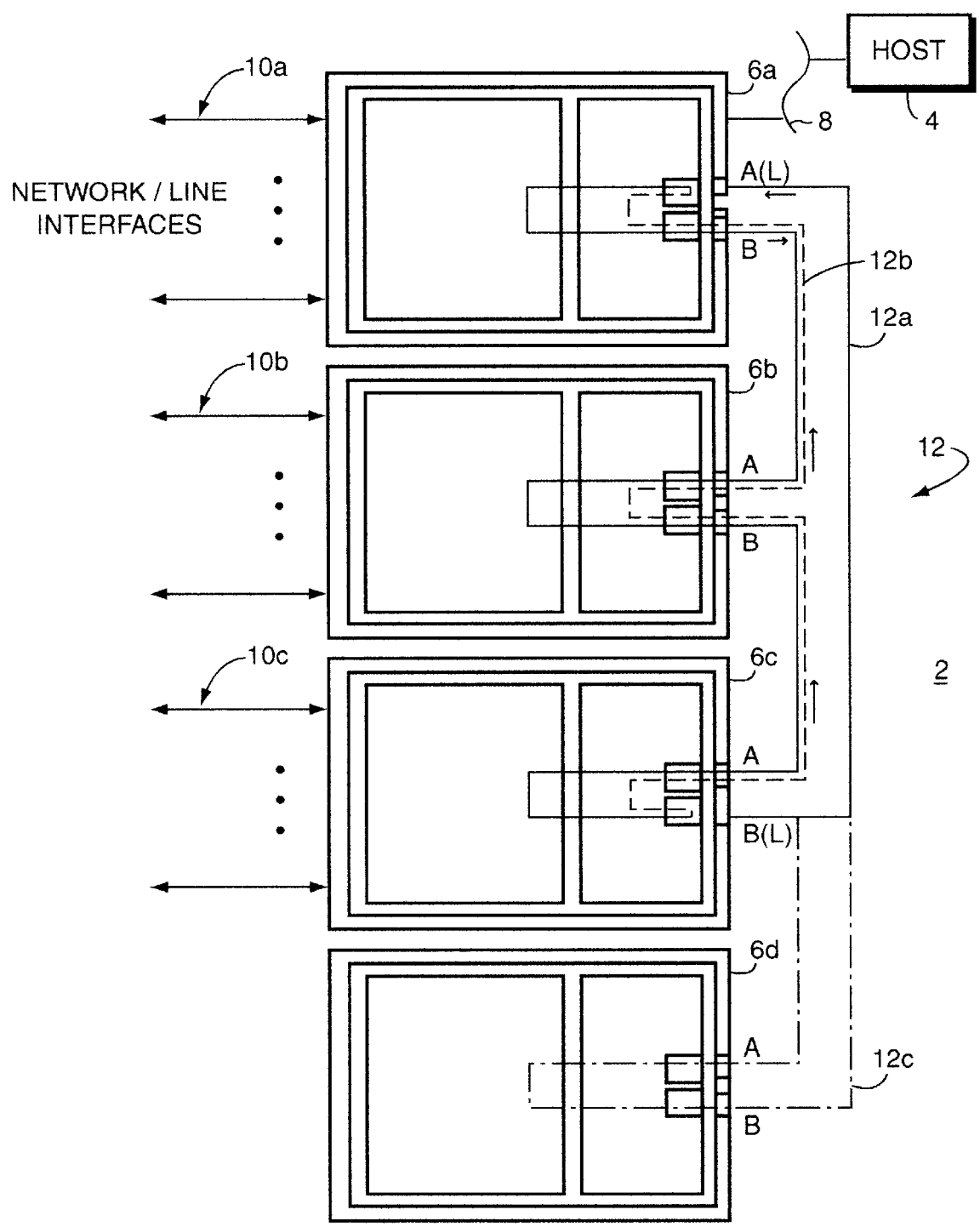
FIG. 2 is a block diagram which illustrates the telecommunications system and the I/O ports of each node in the system, also illustrating the operation of the neighbor nodes during the installation procedure of a new node.

FIG. 2 illustrates in greater detail the telecommunications system 2. The inter-nodal network 12 is configured for providing high speed digital communications among nodes 6a through 6c as represented by the solid line 12a. The node 6a includes a host interface which is connected in communicating relationship with the host 4 by a local area network (LAN) such as Ethernet or some other communication link 8. In such configuration, the node 6a may receive messages from the host 4 which are intended for one of the other nodes and pass such messages to the appropriate node over the inter-nodal network 12a. Other types of host/node interfaces may be used instead of or in addition to the LAN/link 8. In addition, one or more of the remaining nodes 6b and 6c may also be directly connected in communicating relationship with the host 4 via LAN/link 8 (not shown). In the absence of a direct link from the host 4 to each of nodes 6b and 6c, such nodes are preferably connected in communicating relationship with node 6a in such fashion as to allow messages to be transmitted to and received from host 4.

The inter-nodal network 12 is preferably implemented using one or more fiber optic rings. However, the inter-nodal network 12 may also be implemented with any suitable communication network, such as, for example, wide area networks, wireless communications networks, the PSTN, ATM, SONET and the Internet.

The overall operation of the system 2 is controlled by the host 4, which is commonly implemented with a personal computer (PC), workstation, fault tolerant or other computer on which a user's application software runs. The host 4 communicates with the nodes 6a through 6c by exchanging messages over the LAN/link 8. The messages are typically used to configure the nodes as well as to direct call processing functions such as making connections and providing communication services (i.e., tone detection, tone generation and conferencing).

Although only a single host 4 is shown, use of the LAN 8 to provide a host/node communications path permits multiple hosts to control the system 2 (or parts thereof) by configuring a host as a "client" and each node as a "server." A host can be implemented as a printed circuit card that is physically connected within a node, or it may be an external host.

Each of the nodes 6a through 6c may include interfaces 10a through 10c with the public switched telephone network (PSTN) (not shown) or a private network (not shown). The term "private network" is intended in a broad sense to refer to any network or line or other interface other than the PSTN. Network/line interfaces 10a through 10c may terminate either digital networks or analog trunks/lines, or combinations of both types. The network/line interfaces of a given node may include suitable interfaces for performing telecommunications using ATM, Signaling System 7 (SS7), ISDN, T1-Robbed Bit, E1-CAS, TCP/IP or other communications protocols.

Additional details of the redundancy, fault isolation and expanded switching capacity features of system 2 are described in commonly-assigned U.S. Pat. No. 5,923,643, which is incorporated herein in its entirety. Briefly, in that patent, a system is described in which a fault within a particular node or a portion of an inter-nodal network may be isolated and prevented from degrading system performance. This is accomplished in part by providing each node with a loopback mode of operation. In the event of a failure of either a node or a portion of an inter-nodal network, the loopback mode of operation may be invoked to isolate the failure and allow the remainder of the system to continue to operate without interruption of service. The loopback mode of operation may also be advantageously used in the present invention as described below.

More specifically, with reference to FIG. 2, each of the nodes of 6a through 6c includes two I/O ports, denoted A and B, which are physically interfaced with the inter-nodal network 12a. In open operating mode, each of nodes 6a through 6c receives packetized information through port A and transmits packetized information to the other nodes through port B as indicated by the solid arrows.

Figure 3B:
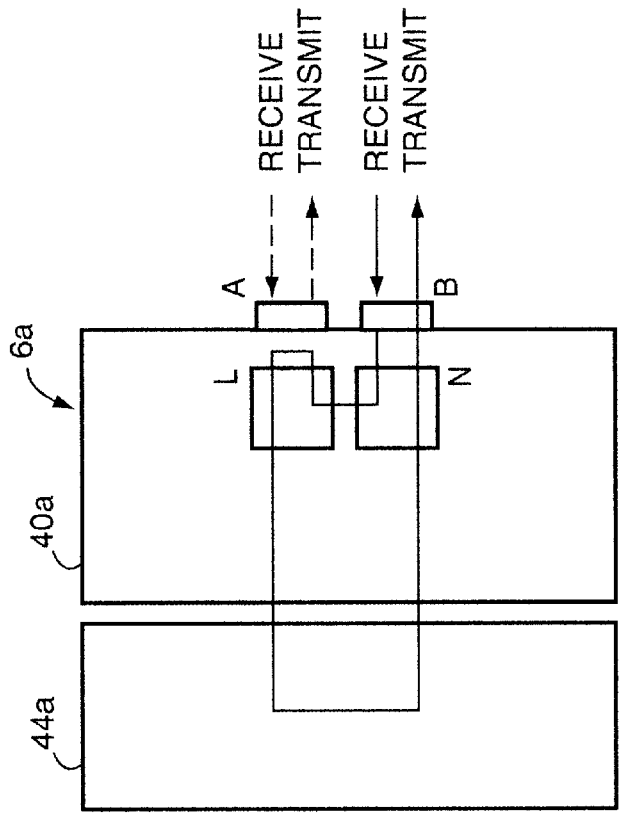
FIGS. 3A and 3B are block diagrams which illustrate the open mode of operation and a loopback mode of operation of a node.
Figure 3A:
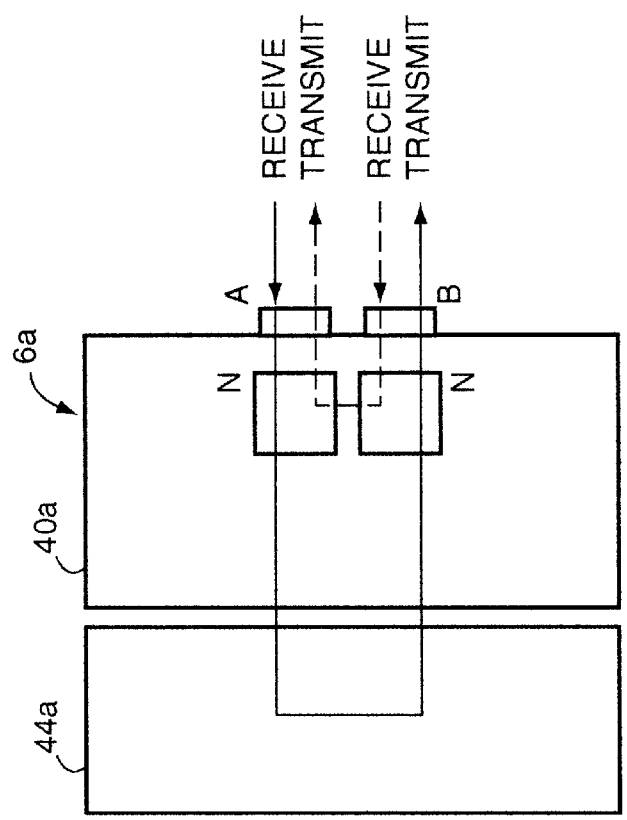

An alternative mode of operation, the loopback mode, may be understood with reference to FIGS. 3A and 3B. As shown by the solid line in FIG. 3A, in the open mode of operation, packetized information is received from the inter-nodal network 12 (not shown in FIG. 3A) at port A of a network I/O card 40a and is passed through to a nodal switch 44a of node 6a. Information originating from the nodal switch 44a within node 6a is passed through the network I/O card 40a and then transmitted by way of port B as shown in FIG. 3A. Stated another way, during the open mode of operation, information passing between the nodal switch 44a and the inter-nodal network 12 passes in one direction only, through each of ports A and B.

In contrast, as shown by the solid line in FIG. 3B, during a loopback mode of operation, port A is effectively disconnected from the inter-nodal network 12 while port B functions to both receive and transmit information. Thus, packets still pass through the node 6a. Conventionally, a particular node may operate in loopback mode as to a certain port in response to a message from the host or a detection of any number of conditions on the inter-nodal network 12, such as either a fault, or during initialization of the system.

Figure 4:
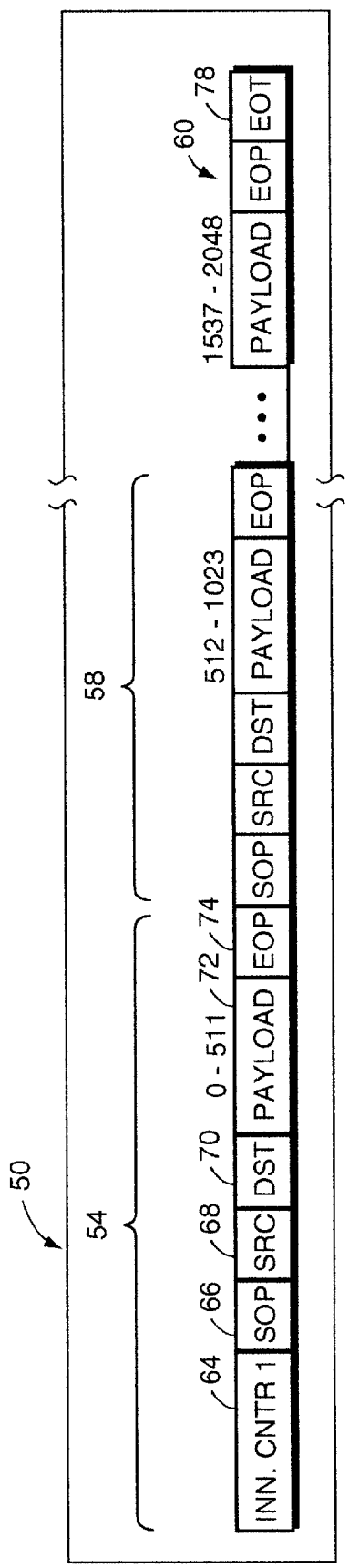
FIG. 4 is a block diagram illustrating a preferred embodiment of a frame structure which includes the inter-nodal network control word.

Communications over the inter-nodal network 12 are preferably carried out using a frame/packet structure as shown in FIG. 4. A frame 50 contains at least one packet 54 and may contain additional packets 58, 60 for carrying data, address and control information over the inter-nodal network 12. The maximum number of packets frame 50 may contain is a largely function of the bandwidth of the inter-nodal network 12. In a preferred embodiment of the present invention, frame 50 may contain up to thirty packets.

Each frame 50 begins with an inter-nodal network control word 64 which is preferably a 16-bit entity. Control word 64 is used to effect certain control functions with respect to a node which either receives the control word or transmits it to another node. Typically, the master node will use the control word 64 to direct a non-master node to perform a particular control function. However, as described herein, in certain instances, non-master nodes may use the control word 64 to communicate with the master node. Each packet 54, 58, 60 contains a start-of-packet (SOP) entity 66, a source address (SRC) 68, which is preferably a logical node identification (ID) of the node from which frame 50 originates, a destination address (DST) 70, which is preferably a logical node ID of the node to which the frame 50 is destined. Following those entities is a payload 72 which, in the illustrative embodiment, has a capacity of 512 bytes of data. An end-of-packet (EOP) entity 74 follows the payload 72. The end of frame 50 is represented by an end-of-transmission (EOT) entity 78.

Details of a messaging sequence followed in accordance with the present invention when a node, such as the node 6d (FIG. 2), is to be added to an active inter-nodal network 12 will now be described. Assume that the inter-nodal network 12 has been appropriately configured and initialized and is now carrying data among nodes 6a–6c. Further assume that one of those nodes has become a master node through an arbitration process described in U.S. Pat. No. 5,923,643, referenced above. For this example, we will assume that node 6b is the master node.

Initially, prior to commencing the process of adding a new node, a determination must be made whether any node in the system 2 is currently operating in loopback mode. Preferably, the host 4 already has this information as a result of being automatically notified by any node when that node has gone into loopback mode for any reason (i.e., fault isolation, node addition in progress, etc.) If there is a node with a looped back port, it should first be restored to open mode before proceeding further with the process of adding a new node. Otherwise, there is a risk that a node may become isolated when the two neighbor nodes adjacent to the position selected for the new node loop back their respective ports.

Figure 5:
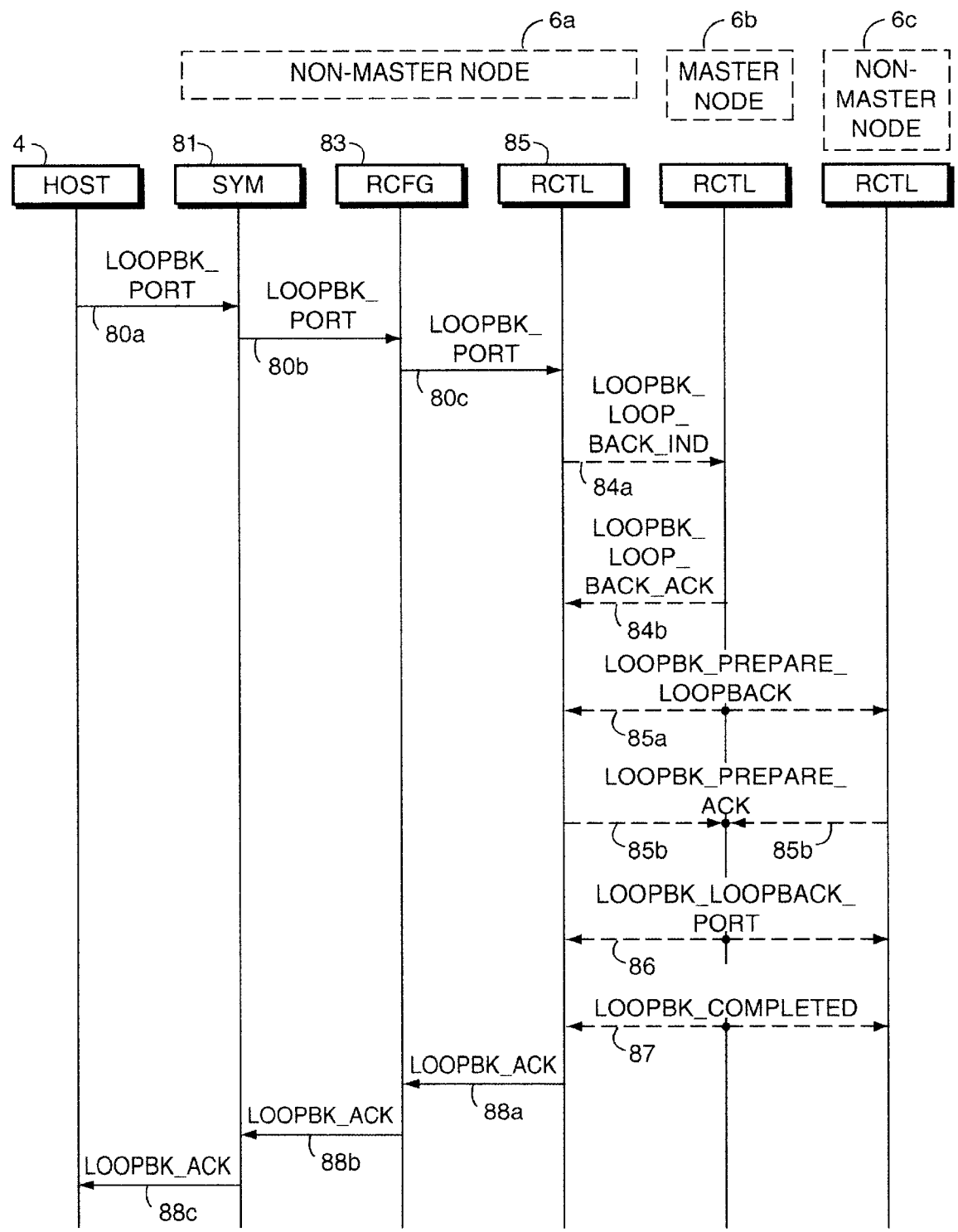
FIG. 5 is a message flow diagram which illustrates certain aspects of the messaging sequence used to place the two neighbor nodes in a loopback mode of operation when a non-master node initially received the operative host-issued message.
Figure 6:
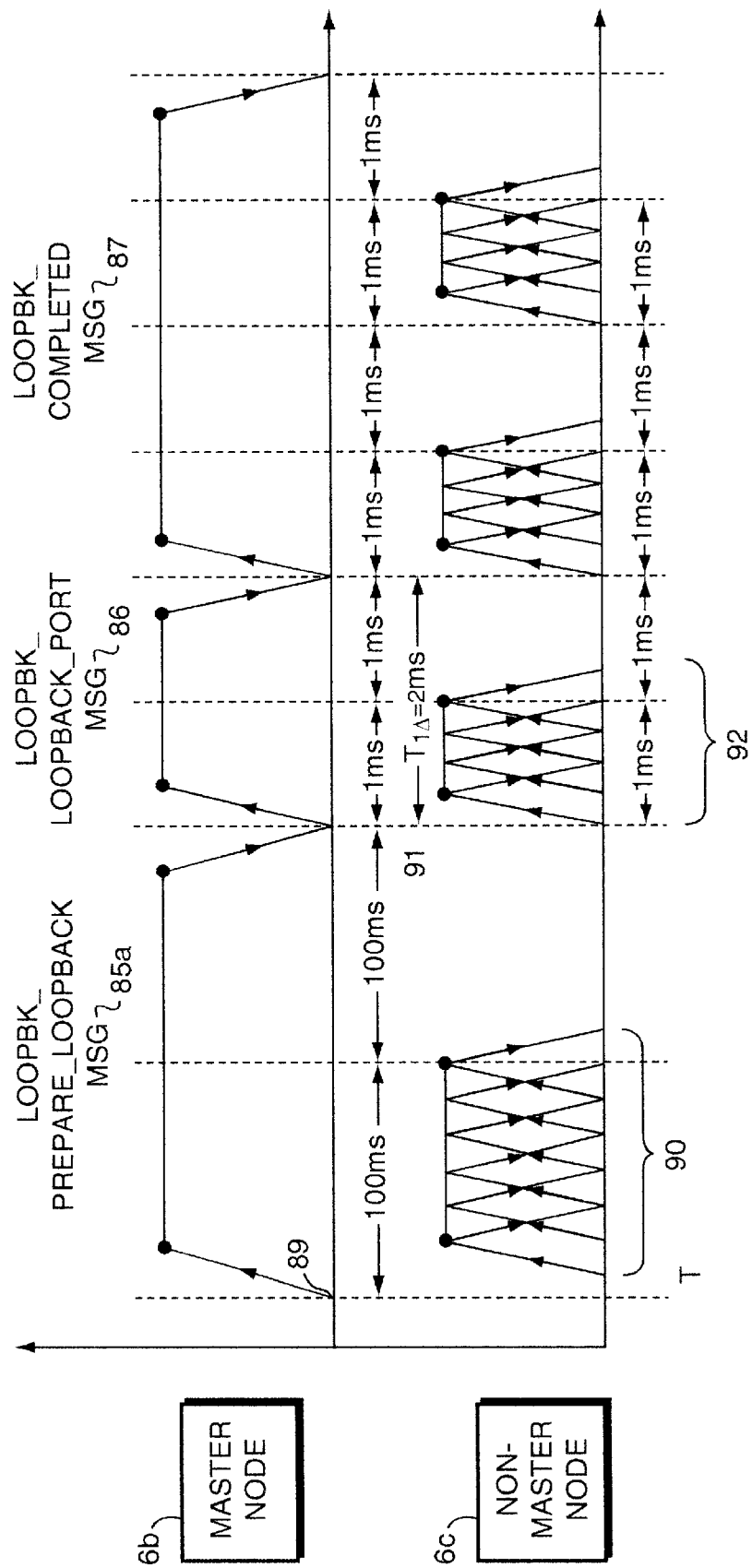
FIG. 6 is a timing diagram which illustrates the time relationship of certain messaging sequences.

With reference now to FIGS. 2, 5 and 6, assuming that no node is operating in loopback mode, the host 4 begins the process of adding a new node by issuing a LOOPBK_PORT message 80a which is received by a system monitor (SYM) task 81 running on non-master node 6a. The SYM 81, in turn, issues a LOOPBK_PORT message 80b to a ring configure (RCFG) task 83, which in turn issues a LOOPBK_PORT message 80c to a ring control (RCTL) task 85 running on the non-master node 6a. This message and the others shown with solid arrows are messages which pass between processes internal to a node or they are API (Application Program Interface) messages issued or received by the host. The messages shown with a dashed line are messages which are sent, using control word 64, over the inter-nodal network 12.

In response to the LOOPBK_PORT message 80c, the RCTL task 85, using control word 64, passes a LOOPBK_LOOP_BACK_Indication message 84a to the master node 6b over the inter-nodal network 12. As a result of receiving the LOOPBK_LOOP BACK_Indication message 84a, the master node 6b is informed that the neighbor nodes are to be instructed to loop back their respective ports. To ensure that the master node 6b receives the LOOPBK_LOOP_BACK_Indication 84a, this message is preferably sent continuously until the non-master node 6a (sending the message) receives a LOOPBK_LOOP_BACK_ACK 84b from the master node 6b.

Once the LOOPBK_LOOP_BACK_ACK message 84b is received by the non-master node 6a, the non-master node 6a will stop sending any messages using the network control word 64. This allows the master node 6b to be the only node in the network which controls the contents of the control word 64. If the non-master node 6a does not receive the acknowledgment from the master node 6b, it will notify the host 4 that there has been an interruption in the procedure.

If, on the other hand, the master node 6b does send the acknowledgment and takes control of the control word 64, it is programmed to thereafter start sending the LOOPBK_PREPARE_LOOP BACK message 85a, again using control word 64. This message is sent to the neighbor nodes between which the new node is to be added.

The LOOPBK_PREPARE_LOOP BACK message 85a is sent by the master node, as indicated by reference numeral 89, preferably continuously for approximately 200 ms to be sure that both neighbor nodes receive it. (It should be noted that acknowledgment messages are omitted from FIG. 6 for purposes of improved clarity.) Concurrently, the neighbor nodes initialize a timing procedure during which the nodes read the control word 64 approximately every 250 microseconds, as indicated by reference numeral 90. This is to ensure that the neighbor nodes will react quickly to the anticipated instructions from the master node 6b.

Assuming that the master node 6b does receive the LOOPBK_PREPARE_LOOPBACK_ACK message 85b from both nodes, it starts to send a LOOPBK_LOOP BACK_PORT message 86. Both neighbor nodes 6a and 6c will receive this message with a maximum of 1ms delay, as they read the control word 64 as indicated by reference numeral 92. After each neighbor node 6a and 6c receives message 86, each node will preferably schedule the transition of the operating mode of its respective I/O port from open to loopback mode in approximately 2 ms. This 2 ms delay allows both nodes to receive the instruction before either one of them actually transitions to loopback mode. Otherwise, one of the nodes might receive the message and immediately loop back its port thereby possibly causing the other node never to receive the loop back instruction.

After a 2 ms delay, the master node sends a LOOPBK__LOOP BACK__COMPLETED message 87 using control word 64. The two neighbor nodes are programmed to wait for the message 87. If the neighbor nodes do not receive it within a certain time period, then they will notify the host of a problem. Otherwise, after that time period, the non-master node 6a informs the host 4 of the successful completion of this phase of the process via messages 88a, 88b and 88c of FIG. 5. At this point, port "A" of node 6a and port "B" of node 6c are operating in loopback mode.

Figure 7:
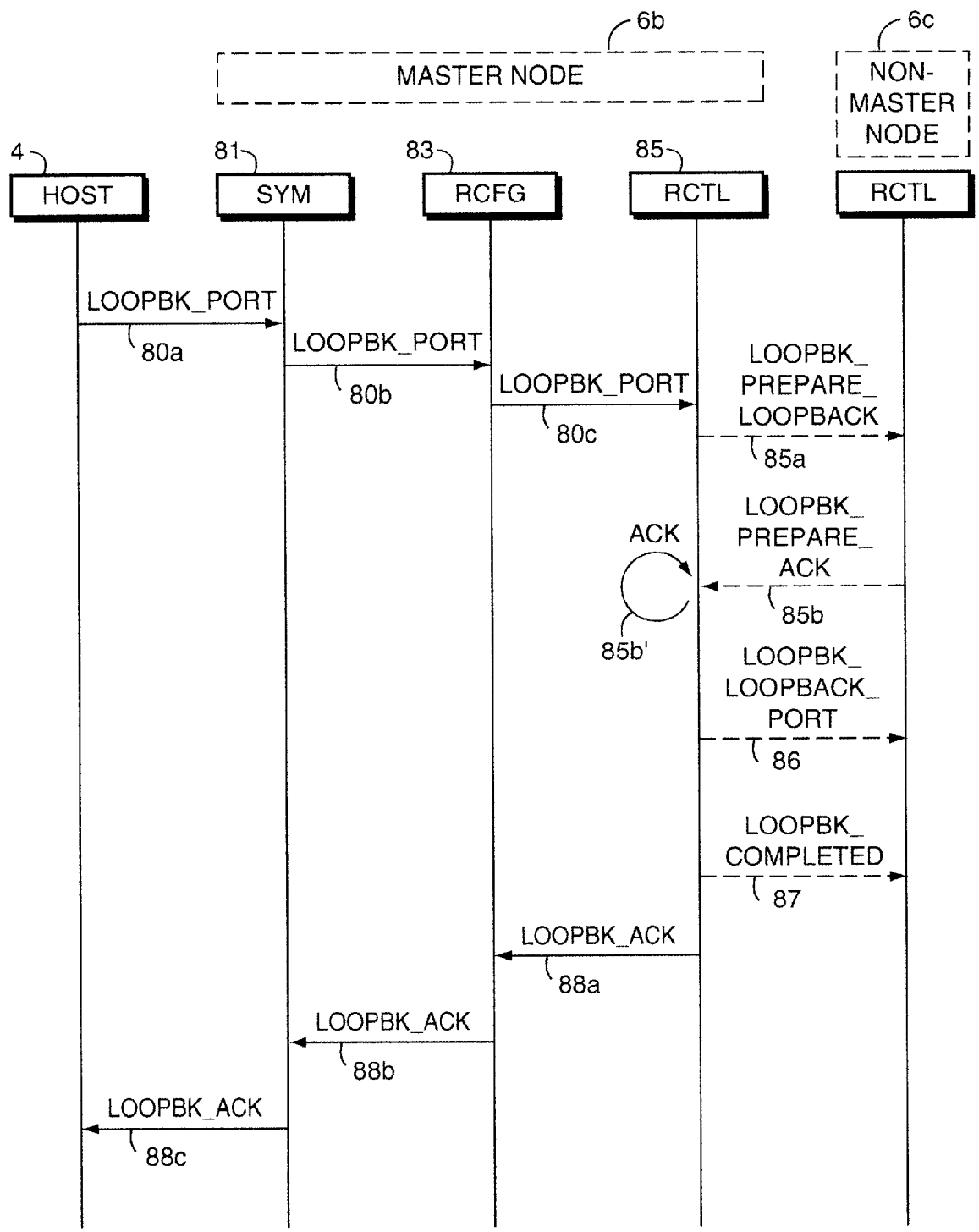
FIG. 7 is a message flow diagram which illustrates certain aspects of the messaging sequence used to place the two neighbor nodes in a loopback mode of operation when the master node initially receives the operative host-issued message.

FIG. 7 illustrates the case in which the master node 6b is the node that receives the initial loop back port message 80a from the host 4 because it is one of the neighbor nodes in that instance. In such a case, the initial messaging sequence in which the message 80a passes to the SYM 81 task which in turn passes message 80b to the RCFG 83 task, and ultimately to the RCTL 85 task is the same as that described with reference to FIG. 5. However, the LOOPBK__LOOP__BACK__Indication and LOOPBK__ACK sequence does not need to be followed because the master node 6b has been notified directly by the host 4 and the master node 6b simply sends the LOOPBK__PREPARE__LOOP BACK message 85 in order to begin the synchronized routine for the two neighbor nodes in that instance to loop back their respective ports simultaneously. The master node waits for the acknowledgement ACK message 85b from the non-master, and it also waits for its own ACK message 85b'. Assuming that such acknowledgments are received, the process continues in the manner described herein.

After both neighbor nodes, such as the neighbor nodes 6a and 6c of FIG. 2, have simultaneously looped back their ports, the physical connection of the new node 6d into the network 12 can take place. The new node 6d must be prepared, however, for entry into an active inter-nodal network. It is desired that the new node 6d operate as if it had always been part of the network 12.

Figure 8:
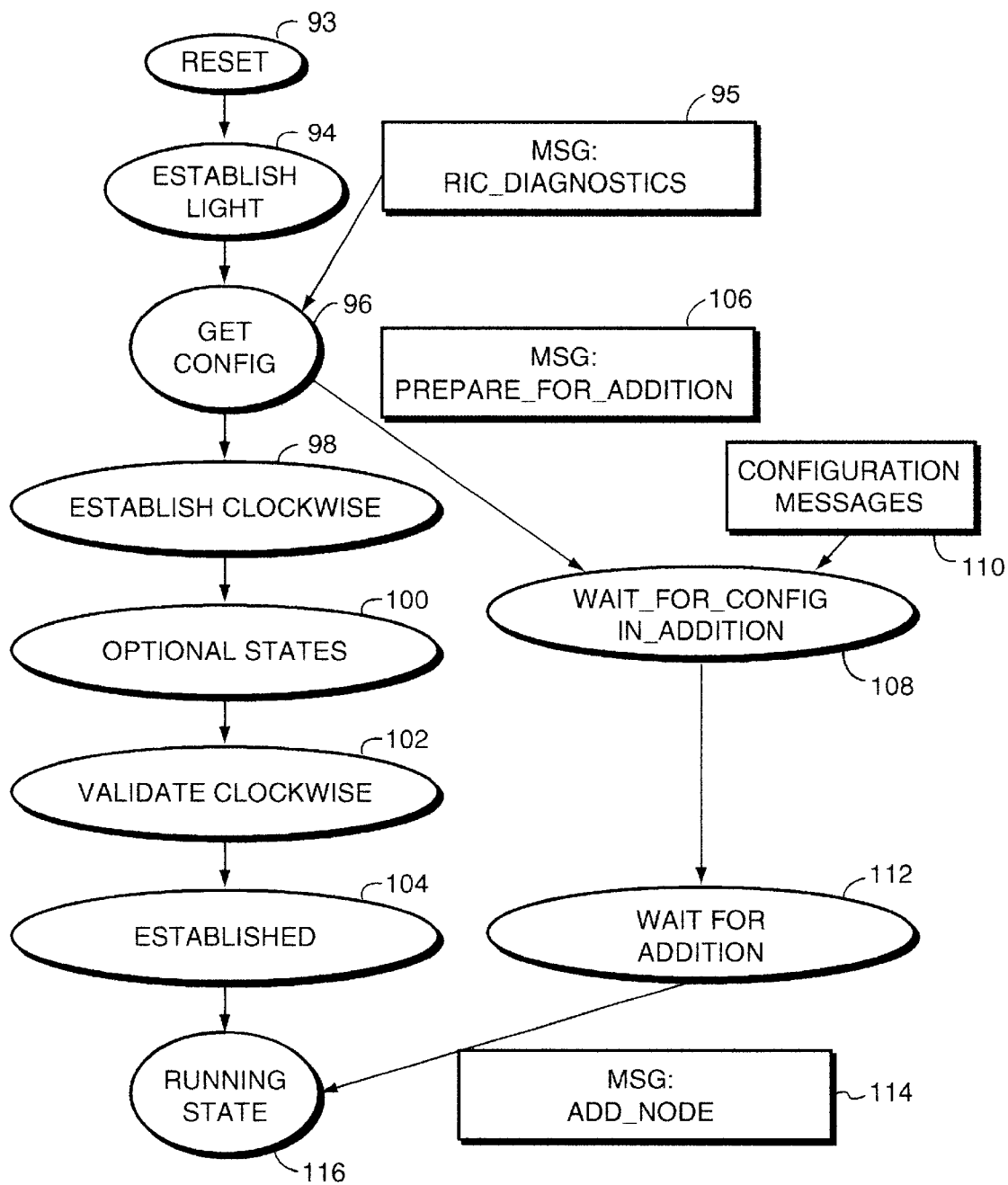
FIG. 8 is a flow diagram illustrating the logical states in which a new node operates while being added to the system.

Accordingly, in order to accomplish this, the new node 6d is programmed in accordance with the present invention to short cut the normal sequence of operating states through which it would otherwise transition and, instead, to follow a special sequence of states until it is in a running state and the network 12 is ready to include it. More specifically, FIG. 8 is a state transition diagram illustrating the states in which the new node 6d will remain while both it and the network 12 are prepared for its addition thereto. The new node 6d is powered on and begins operations in the RESET state designated in step 93. It is typically configured in hardware to immediately begin to look for an external connection by checking for light (i.e., the presence of an optical signal) on its "A" and "B" I/O ports. This is illustrated by the ESTABLISH LIGHT state 94 in FIG. 8. At this point, the new node 6d is connected, typically by an Ethernet interface, to the host 4. (FIG. 2). The system software needed to operate the node on the network is then down-loaded into an appropriate storage device within the node. The new node 6d is then preferably assigned, by the host 4, a unique logical node ID which will identify it on the network 12, as described in U.S. Pat. No. 5,923,643, referenced herein.

A message is then issued by the host 4, which may be controlled by a user, to cause the new node to perform a diagnostic check, as desired in the particular circumstances. This is designated in FIG. 8 by the message box 95 entitled MSG: RIC__DIAGNOSTICS. Diagnostic sequences may then be run to check the operation of the node 6d. Any diagnostics should be run before the new node 6d is brought into service on the network to prevent undesirable service interruption.

After performing all diagnostic tasks triggered by the RIC-DIAGNOSTICS message 95, the node waits for configuration messages in the GET CONFIG state 96. Normally, upon receipt of such information, a node would automatically move to the ESTABLISH CLOCKWISE state 98 and through the remaining states 98 through 104, in the normal sequence of events. However, in accordance with the invention, a message is then issued by the host 4 entitled MSG: PREPARE__FOR__ADDITION 106, which causes the node 6d to operate on an alternative path in which it transitions to the WAIT __FOR__CONFIG__IN__ADDITION state 108. This is a short cut from the normal sequence of states several of which are illustrated by example in steps 98 through 104 of FIG. 8.

The new node 6d will wait in the state 108 until it receives configuration information from the host 4. Before the host provides such information, however, it is preferred that the new node 6d is checked to ascertain that both of its I/O ports are open, that its transmitters are disabled in hardware, (this is so that the node cannot begin transmitting onto the network until it is desired that it do so), and that the diagnostic checks have been successful. Now, the configuration messages may be sent by the host 4 as indicated by block 110 in FIG. 8. These configuration messages will preferably include the following elements: a logical network identification, as there may be more than one network in the system 2, an indication that the new node is configured for the transmit mode (which becomes effective only after subsequent authorization as described hereinafter), and the number of packets, such as the packets described with reference to FIG. 4, it will use. Once this configuration information is obtained, the new node will automatically transition to the WAIT FOR ADDITION state 112 in which it will wait and do nothing until a special message is received from the host 4, which message is MSG: ADD__NODE 114.

At this point, the new node 6d is ready to be brought into service on the inter-nodal network 12. It has been prepared and is waiting in its WAIT FOR ADDITION 112 state. Consequently, the two neighbor nodes 6a and 6c (FIG. 2) should now be returned in synchronized fashion to open operating mode.

Figure 9:
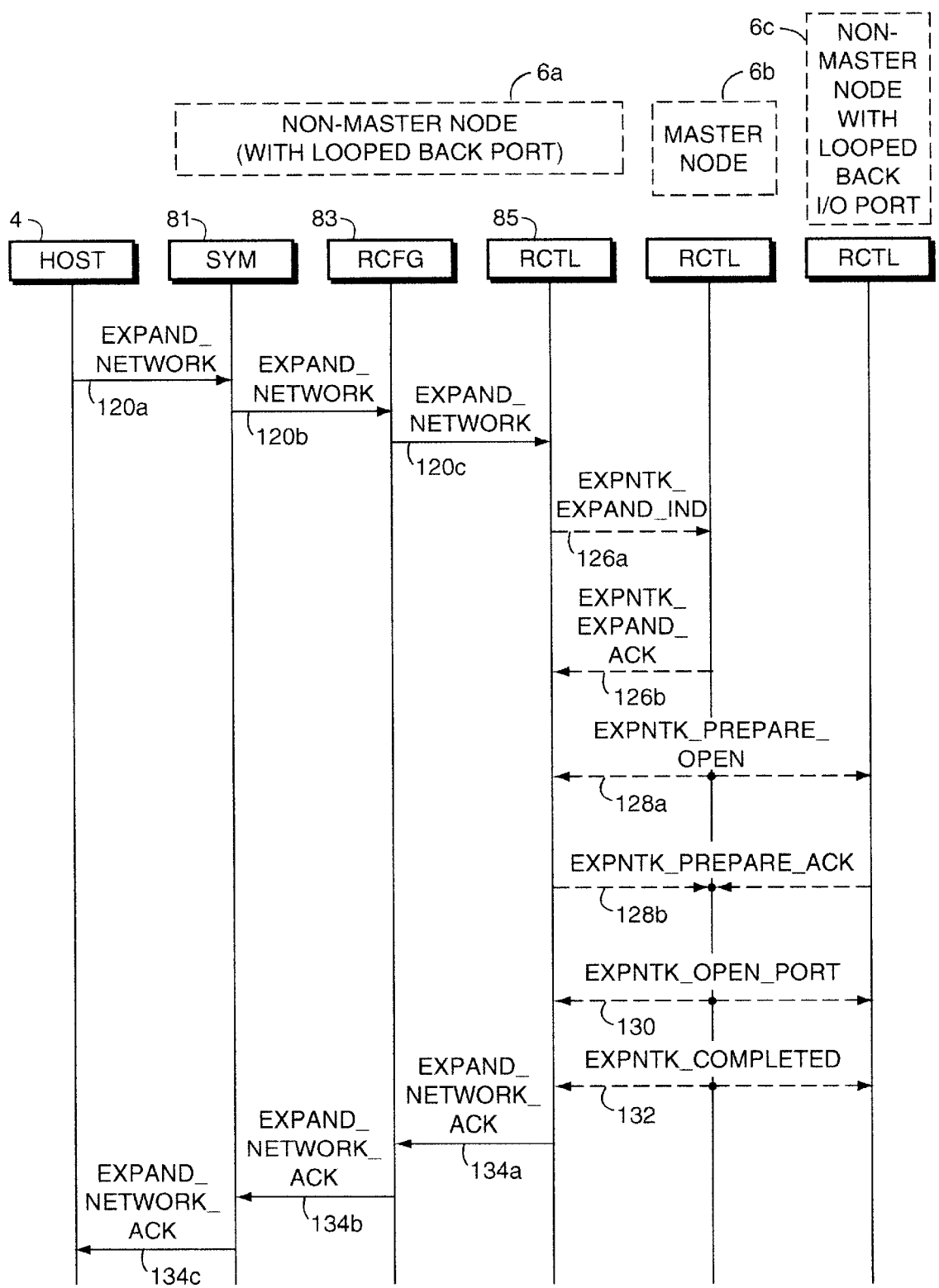
FIG. 9 is a message flow diagram which illustrates the expand network messaging sequence when a non-master node receives the initial message from the host about expanding the inter-nodal network.

The re-opening of the looped back ports in the neighbor nodes is managed in a manner similar to the sequence followed to place the nodes in loop back mode. With reference now to FIG. 9, assume that a non-master node, such as the node 6a in FIG. 2, is connected by a communication link to the host 4. The host 4 issues an EXPAND__NETWORK message 120a which is received by the SYM task 81 on node 6a. The SYM task 81, in turn, sends an EXPAND__NETWORK message 120b to the RCFG task 83, which in turn sends message 120c to the RCTL task 85 of the non-master node. In response, the RCTL task 85, using the control word 64, passes an EXPNTK__EXPAND__IND 126a to the master node 6b. The master node 6b then sends an EXPNTK__EXPAND__ACK message 126b acknowledging receipt of message 126a from node 6a. Upon receipt of acknowledgment 126b, the non-master node 6a stops sending any messages using the inter-nodal network control word 64. This allows the master node 6b to have sole use of control word 64.

The master node 6b then sends a EXPNTK_PREPARE_OPEN message 128a. In a manner similar to that described with reference to the LOOP BACK series of messages, the master node sends the EXPNTK_PREPARE_OPEN message 128a continuously for approximately 200 ms to allow both neighbor nodes to receive it. Once the neighbor nodes receive that message, they acknowledge it with messages 128b.

Assuming that both neighbor nodes receive message 128a, they initialize a timing procedure similar to that previously described to read control word 64 every 250 microseconds, to allow for a quick response time. After the 200 ms time period, the master node 6b then immediately sends the EXPNTK_OPEN_PORT message 130. Upon receipt of this message, the two neighbor nodes schedule the opening of their looped back ports in 2 ms. After the 2 ms delay, the master node starts to send the EXPNTK_COMPLETED message 132. The neighbor nodes, now with their respective I/O ports open, read control word 64 until each node receives the EXPNTK_COMPLETED message 132. This verifies that the inter-nodal network is intact.

Figure 10:
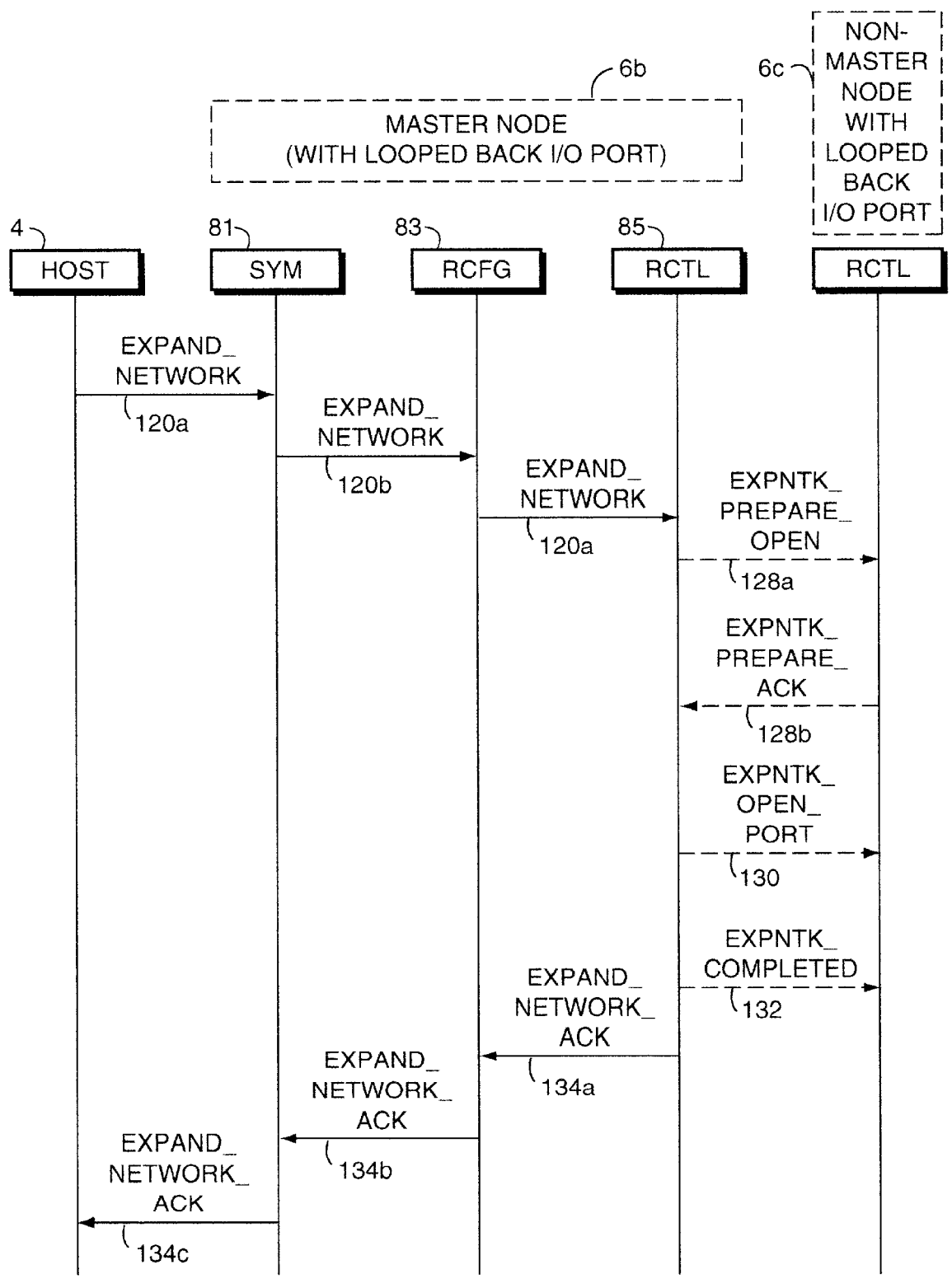
FIG. 10 is a message flow diagram which illustrates the expand network messaging sequence when the master node receives the initial message from the host about expanding the network.

FIG. 10 illustrates a messaging sequence which may be used when it is the master node that receives the message from the host 4 because it is one of the neighbor nodes in that instance. In such a case, the master node can immediately begin to send the EXPNTK_PREPARE_OPEN message 128a to begin the synchronized routine which then proceeds in the same manner as discussed with reference to FIG. 9.

At this point, under normal conditions, there are no looped back I/O ports in any node on the inter-nodal network 12. In order to enable the new node 6d to come into service (e.g., make connections, etc.), that node must transition to the RUNNING state 116 (FIG. 8). The new node 6d will attempt to verify that it is visible on the inter-nodal network 12 by writing its node identification (ID) into the control word 64. When the master node 6b receives the control word 64 containing the node ID for the new node, it returns that node ID in the control word 64 as an acknowledgment. When the new node 6d receives its own node ID back from the master node 6b, it then configures its transmitter to transmit, if it has previously been instructed to do so by the host during the configuration step. The new node 6d then transitions to the RUNNING state 116 and is now in service on the inter-nodal network 12.

It should be understood the foregoing arrangement may be used to add more than one node to an inter-nodal network at one time without an interruption of service, so long as only one break is made in the inter-nodal network.

While the invention has been particularly shown and described with reference to preferred embodiments thereof, it will be understood by those skilled in the art that various changes in form and details may be made therein without departing from the spirit and scope of the invention. Furthermore, the terms and expressions which have been employed are used as terms of description and not of limitation, and there is no intention in the use of such terms and expressions, of excluding any equivalents of the features shown and described or portions thereof, but it is recognized that various modifications are possible within the scope of the invention claimed.

What is claimed is:

1. In an expandable telecommunications system, comprising a plurality of interconnected nodes for performing telecommunications switching or other services, said nodes being interconnected by an inter-nodal network, a method of expanding an active inter-nodal network by the inclusion of at least one new node while the inter-nodal network continues to operate essentially uninterrupted, the method including the steps of:

(A) establishing said active inter-nodal network by connecting nodes each having an "A" I/O port, which has its own transmit and receive coupling, and a "B" I/O port, which has its own transmit and receive coupling, and each of said nodes has a normal mode of operation in which packetized information traverses said inter-nodal network through the receive coupling of the "A" port, and exit the node by the transmit coupling of the "B" port, and said nodes each further having a loop back mode of operation in which one I/O port of each fo said nodes does not transmit or receive packets external to that node, but instead is effectively disconnected from the inter-nodal network, while the other port of each of said nodes functions to both receive and transmit packets using its receive and transmit couplings and an alternate communication path, such that said packetized information continues to travel among the nodes of the inter-nodal network;

(B) configuring one of said nodes as a master node capable of sending control messages via the inter-nodal network to other nodes connected to said inter-nodal network, being non-master nodes;

(C) connecting in communicating relationship to at least one of said nodes a host;

(D) selecting a location along the active inter-nodal network, between two nodes, being first and second neighbor nodes, to insert a at least one new node;

(E) preparing the new node for non-disruptive addition to the active inter-nodal network;

(F) sending a first message, issued by said host, in response to which the master node begins a first synchronized routine whereby each neighbor node places into loop back mode its I/O port that will be adjacent to the new node when the new node is inserted into said selected location;

(G) physically disconnecting said inter-nodal network between said first and second neighbor nodes after said first and second neighbor nodes are operating in loop back mode;

(H) incorporating said new node into the inter-nodal network by physically connecting said inter-nodal network between said new node and each of said first and second neighbor nodes;

(I) sending an expand network message, issued by said host, addressed to the master node, which, in response thereto, the master node instructs the first and second neighbor nodes to institute a synchronized routine whereby each of said first and second neighbor nodes returns its respective port to open mode at approximately the same time;

(J) sending a third message, issued by said host, addressed to said new node, in response to which said new node attempts to verify that it is visible by the master node on the inter-nodal network by sending a node identification message addressed to the master node and waiting for an acknowledgment thereof by the master node;

(K) verifying the integrity of the inter-nodal network now including the new node, whereby telecommunications switching among all nodes on the inter-nodal network continues and now includes the new node; and (L) establishing a frame architecture for transmitting information and messages among said plurality of interconnected nodes interconnected by said inter-nodal network, and including within each said frame, at least one packet of information as well as an inter-nodal network control word, said control word for effecting control functions with respect to a node on said inter-nodal network, which either receives the control word or transmits it to another node on said inter-nodal network.

2. The method of claim 1 including the further step of:
said master node, in response to said first message issued by said host, institutes said first synchronized routine including a loopback sequence using the inter-nodal network control word to send a first loopback sequence message to each of said first and second neighbor nodes instructing those first and second neighbor nodes to prepare to loopback their respective I/O ports which will be adjacent to said new node when said new node is added into said active inter-nodal network.

3. The method of claim 2 including the further step of:
each of said first and second neighbor nodes, in response to said first loopback sequence message, sends an acknowledgment message to said master node, and substantially simultaneously begins to read said inter-nodal network control word repeatedly at regular intervals to enable a quick response time to upcoming instructions from said master node concerning said loopback sequence.

4. The method of claim 3 including the further step of:
said master node, after receiving said acknowledgment from each of said first and second neighbor nodes, uses said control word to send to each of said first and second neighbor nodes a second loopback sequence message instructing each of said first and second neighbor nodes to loopback their respective I/O port substantially simultaneously.

5. The method of claim 4 including the further step of:
each said first and second neighbor nodes, upon receipt of said second loopback sequence message, schedules the transition of the operating mode of its respective I/O port from open to loopback mode after a predetermined time delay whereby both of said first and second neighbor nodes receive said second loopback sequence message prior to one or the other of the neighbor nodes transitioning to loopback mode.

6. The method of claim 5 including the further step of:
said master node sending a third loopback sequence message to each of said first and second neighbor nodes indicating that the loopback sequence is completed, and upon either one of said first and second neighbor nodes not receiving said third message after a predetermined time period, then that neighbor node generates and sends a notification message to said host informing the host of an interruption in the loopback sequence.

7. The method of claim 1 including the further step of:
preparing the new node for non-disruptive addition to said active inter-nodal network including programming said new node to short-cut a normal sequence of operating states through which it would otherwise transition and, instead, follow a distinct sequence of operating states in response to certain host-issued messages when it is physically connected into said inter-nodal network.

8. The method of claim 7 including the further step of:
in preparing said new node for non-disruptive addition to said active inter-nodal network, said host issuing a diagnostic message instructing said new node to run a diagnostic check.

9. The method of claim 7 including the further step of:
in preparing said new node for non-disruptive addition to said active inter-nodal network, said host issuing a second message instructing said new node to wait for configuration information.

10. The method of claim 9 including the further step of:
said host sending a message to said new node including configuration information and specifying a unique logical node identifier for said new node.

11. The method of claim 10 including the further step of:
said host sending a fourth message to said new node indicating that the system is ready for the addition of said new node, in response to which the new node waits for a subsequent instruction from said host informing the new node that it may begin active participation in said active inter-nodal network.

12. The method of claim 11 including the further step of:
said master node, in response to said host-issued expand network message, initiates an expand network sequence including said second synchronized routine, and said master node using said control word to send a first expand network sequence message to each of said first and second neighbor nodes instructing each said first and second neighbor node to prepare for a network expansion, in response to which each of said first and second neighbor nodes initializes a timing procedure in which each of said first and second neighbor nodes reads the inter-nodal network control word repeatedly at regular time intervals to enable a quick response time to upcoming instructions from the master node concerning network expansion.

13. The method of claim 12 including the further step of:
said master node issuing a second network expansion sequence message instructing each neighbor node to return its I/O port that is currently operating in loopback mode back to open mode.

14. The method of claim 13 including the further step of:
in response to said second message received from said master node, each of said neighbor nodes schedules the transition of the operating mode of its respective I/O port from loopback to open mode after a predetermined time period.

15. The method of claim 14 including the further step of:
said master node sending a message in said expand network sequence to each of said first and second neighbor nodes indicating that the expand network sequence is completed, and upon either one of said first and second neighbor nodes not receiving said message after said predetermined time period, then that neighbor node generates and sends a notification to said host informing the host of an interruption in said expand network sequence.

16. The method of claim 15 including the further step of:
said new node writing its own logical node identifier into the inter-nodal network control word and sending it via the control word to the master node, and waiting for said master node to return, as said acknowledgment, a message containing the logical node identifier of said new node via said control word.

17. The method of claim 16 including the further step of:
in response to said acknowledgment from said master node, said new node transitions to a running state in which it is actively participating on the active inter-nodal network.

18. The method of claim 1 wherein:
said first message issued by said host is received by a non-master node in said system, in response to which said non-master node passes a message via said inter-nodal network control word to said master node indicating that a loopback sequence is to be initiated.

19. The method of claim 18 including the further step of:

said master node, upon receiving said message from said non-master node, sends an acknowledgment message to said non-master node.

20. The method of claim 19 including the further step of:

in response to said acknowledgment message sent by said master node, said non-master node stops sending messages via the control word thus allowing the master node to write messages into the control word.

21. The method of claim 20 including the further step of:

said master node initiates a loopback sequence.

22. The method of claim 21 wherein:

said message issued by said host indicating that the inter-nodal network is about to be expanded is received by said non-master node in said system, and said non-master node, in response, passes a further message via said inter-nodal network control word to said master node indicating that an expand network sequence is to be initiated.

23. The method of claim 22 wherein:

said master node, upon receiving said message from said non-master node, sends an acknowledgment message to said non-master node.

24. The method of claim 23 wherein:

in response to said acknowledgment sent by said master node, said non-master node stops sending messages via the control word thus allowing the master node to write messages into the control word.

25. The method of claim 24 including the further step of:

said master node initiates said network expansion sequence.

26. The method of claim 25 including the further step of:

said host, after said new node is physically connected into said active inter-nodal network, sending said third message addressed to said new node including information configuring said new node to operate in one of either transmit/receive mode or receive only mode on said active inter-nodal network.

27. Apparatus which is operable in a node in an expandable telecommunications system which system includes a plurality of such nodes connected to one another by one or more inter-nodal networks, at least one of said nodes in said telecommunications system being connected in communicating relationship with a host, and which system is capable of expansion by the addition of a new node while the system continues to be active, the apparatus comprising:

A. at least one nodal switch being connected in a communicating relationship with an associated inter-nodal network in the system upon which information travels to and from the associated inter-nodal network;

B. said nodal switch having a first and second port, each said port having a transmit coupling and a receive coupling, each said transmit coupling and receive coupling being connected to said associated inter-nodal network, and said first and second ports of each said nodal switch having an open mode of operation in which information travels into the node on a first communication path via the received coupling of the first port of the nodal switch and out of the node on said first communication path via the transmit coupling of the second port of said nodal switch onto said associated inter-nodal network with the transmit coupling on the first port and the receive coupling on the second port being connected to an alternate communications path;

(C) each said nodal switch further being capable of reading an inter-nodal network control word included in a frame traveling around said inter-nodal network, and, in response to certain predetermined messages from said host, being capable of writing messages into said inter-nodal network control word, said messages being addressed to another node on the system; and (D) said nodal switch acts a master node in the system, and as such, in response to a message from said host, the nodal switch as said master node initiates a loopback sequence including a first synchronized routine whereby two nodes in the system, being a first and second neighbor nodes, one of which may be the master node, which are adjacent to a location selected for the addition of a new node to the active system, substantially simultaneously enter a loopback mode of operation whereby the system remains active and carries telecommunications information except for that portion of the system into which the new node will be physically connected.

28. The apparatus as defined in claim 27 wherein:

said master node is programmed in such a manner that in response to a message from the host to expand an active inter-nodal network, said master node initiates an expand network sequence including a second synchronized routine in which said first and second neighbor nodes substantially simultaneously return their respective ports to the open mode of operation, after the new node has been physically connected into the system.

29. An expandable telecommunications system for carrying telephone communications traffic, said system comprising:

A. a plurality of nodes, each of which includes at least one nodal switch having first and second I/O ports, which port has its own transmit and receive coupling, and each said nodal switch having an open mode of operation in which packetized information traverses an inter-nodal network on a first communication path through one coupling of one of said I/O ports and the opposite coupling of the other of said I/O ports, and each said nodal switch further having a loopback mode of operation in which one I/O port of said nodal switch does not transmit or receive packets external to said nodal switch, but instead is effectively disconnected from the inter-nodal network, while the other port of said nodal switch functions to both receive and transmit packets using its receive and transmit couplings and an alternate communication path such that said packetized information continues to travel among the nodes of the inter-nodal network;

B. each of said nodes are capable of sending control messages via an inter-nodal network control word contained within a frame traveling among said nodes, and one of said nodes is a master node with the other nodes being non-master nodes;

C. at least one host connected in communicating relationship with at least one of said nodes and having means for configuring the system, including means for facilitating the addition of a new node to the system between two active nodes, being a first and second neighbor node, while the system remains substantially active; and D. said means for facilitating the addition of said new node includes means for sending a first message addressed to said master node in response to which said master node uses said inter-nodal network control word to initiate a first synchronized routine including a loopback sequence in which each of said first and second neighbor nodes places its I/O port which is to be adjacent to a location selected for said new node into loopback mode whereby information continues to travel in said system during the addition of said new node.

30. The system of claim 29 wherein:

said means for facilitating the addition of said new node includes means for sending a series of messages to said new node to prepare it for addition to the active system.

31. The system of claim 30 wherein:

said series of messages includes configuration messages that include a logical node identifier assigned to said new node, an operating mode assignment being transmit/receive mode or receive only mode, and each said configuration message also including an instruction that said new node should begin communications on an active inter-nodal network.

32. The system of claim 31 wherein:

said means for facilitating the addition of said new node including said host sending a second message addressed to said master node in response to which said master node initiates a second synchronized routine including an expand network sequence whereby said first and second neighbor nodes substantially simultaneously return their respective I/O ports to open mode whereby said information continues to travel in said system, now including said new node.

33. The system of claim 32 further comprising:

means for facilitating the addition of said new node including said host sending a third message addressed to said new node instructing said new node to verify that it is visible to other nodes on said inter-nodal network including said new node writing its own logical node identifier into said inter-nodal network control word and sending it to said master node, in response to which said master node returns said logical node identifier of said new node to said new node as an acknowledgment thus verifying that said new node is visible to other nodes in the system.

* * * * *